United States Patent
Kinoshita et al.

(10) Patent No.: US 7,126,735 B1
(45) Date of Patent: Oct. 24, 2006

(54) OPTICAL SCANNING APPARATUS

(75) Inventors: Hiroki Kinoshita, Toyokawa (JP); Makoto Ooki, Toyohashi (JP); Yoshiki Sugimaru, Shinshiro (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 11/416,196

(22) Filed: May 3, 2006

(30) Foreign Application Priority Data

May 20, 2005 (JP) ............................. 2005-148192
May 20, 2005 (JP) ............................. 2005-148195

(51) Int. Cl.
*G02B 26/08* (2006.01)

(52) U.S. Cl. ..................................... 359/204; 347/241
(58) Field of Classification Search ........ 359/204–208, 359/216; 347/233, 241, 243
See application file for complete search history.

(56) References Cited

U.S. PATENT DOCUMENTS 5,450,119 A * 9/1995 Hinton et al. ............... 347/242

FOREIGN PATENT DOCUMENTS

| JP | 2002-202472 | 7/2002 |
|----|-------------|--------|
| JP | 2003-057585 | 2/2003 |
| JP | 2004-070107 | 3/2004 |

* cited by examiner

*Primary Examiner*—Euncha P. Cherry
(74) *Attorney, Agent, or Firm*—Morrison & Foerster LLP

(57) ABSTRACT

An optical scanning apparatus comprising a plurality of light sources, a polygon mirror for deflecting beams emitted from the light sources in a main scanning direction, lenses for imaging the deflected beams on receiving surfaces and diverting mirrors for directing the beams which passed through the lenses to the receiving surfaces. In one side of the polygon mirror, three diverting mirrors are provided in an upper optical path, and two diverting mirrors are provided in a lower optical path. In the other side of the polygon mirror, one diverting mirror is provided in a lower optical path, and two diverting mirrors are provided in an upper optical path. Thereby, bows on the receiving surfaces have the same curving direction, and color displacement can be inhibited.

9 Claims, 9 Drawing Sheets

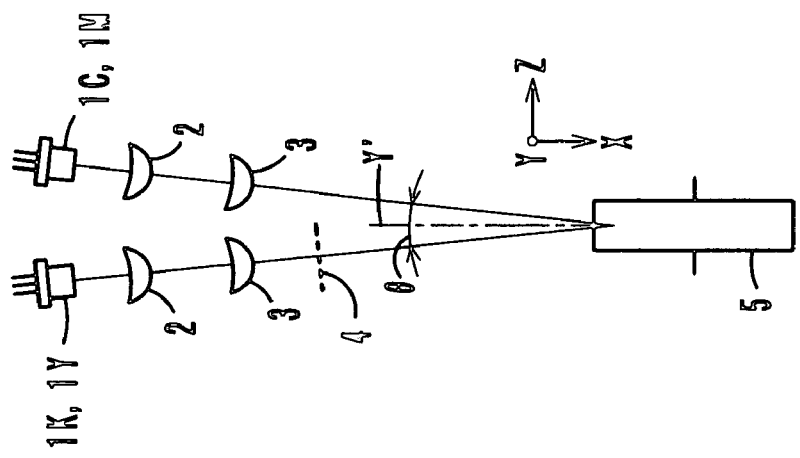
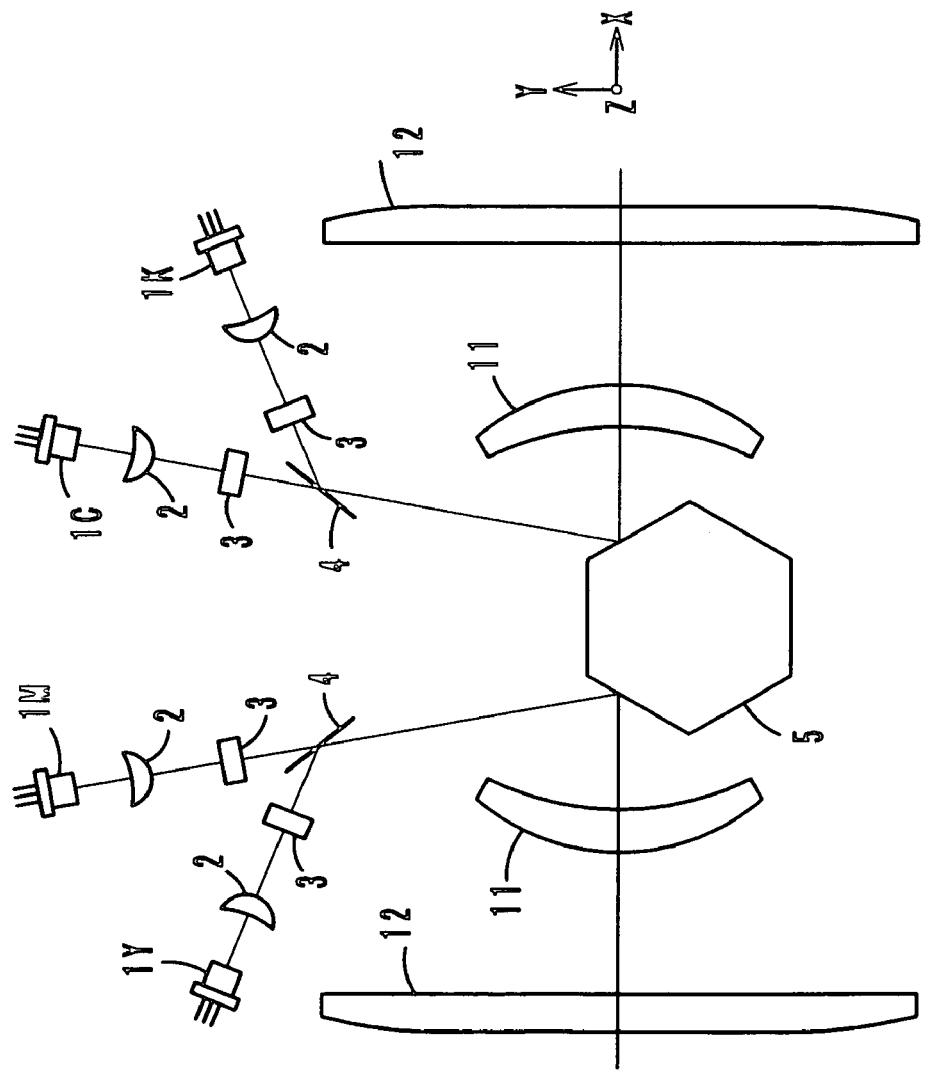
FIG. 2b
FIG. 2a

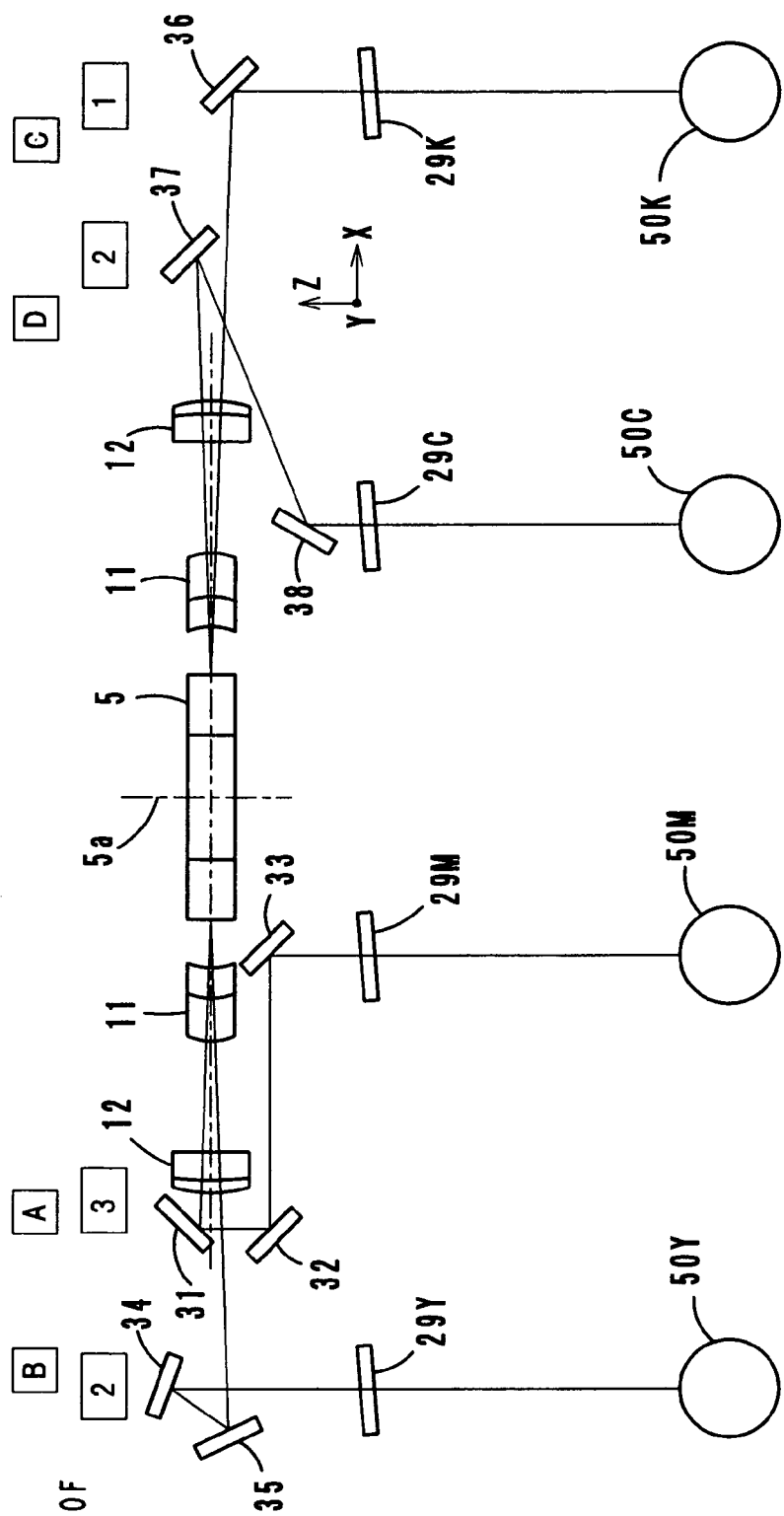

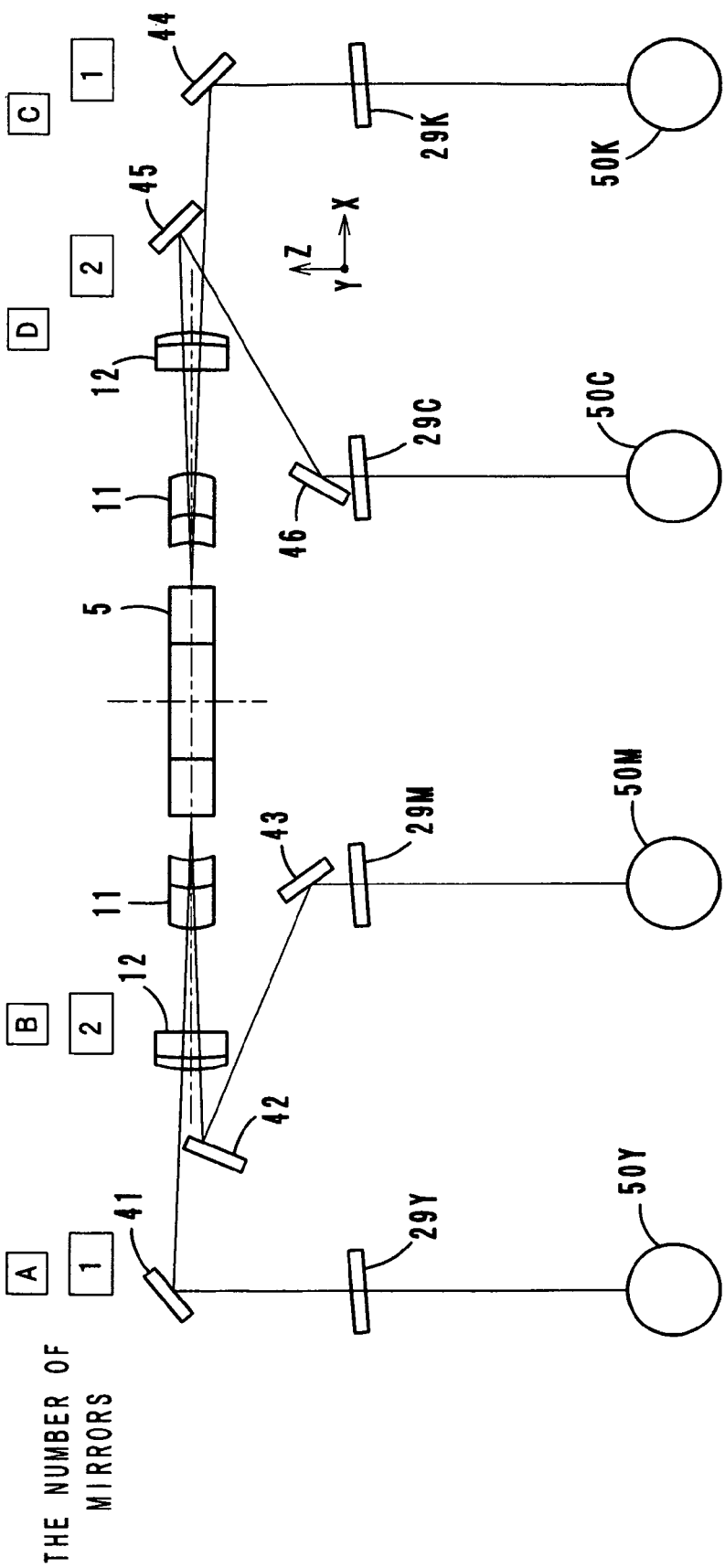

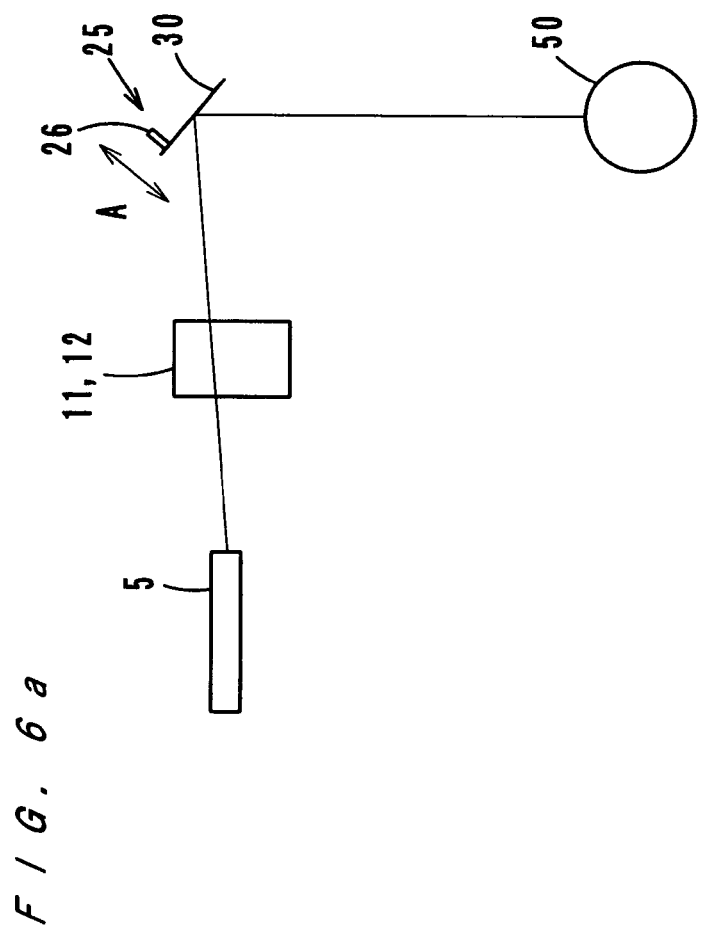
F I G. 6 a
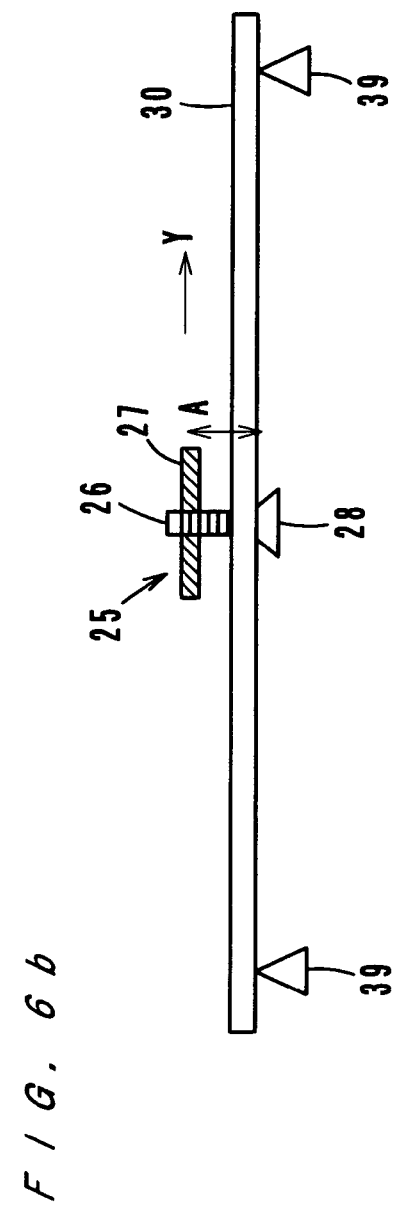
F I G. 6 b

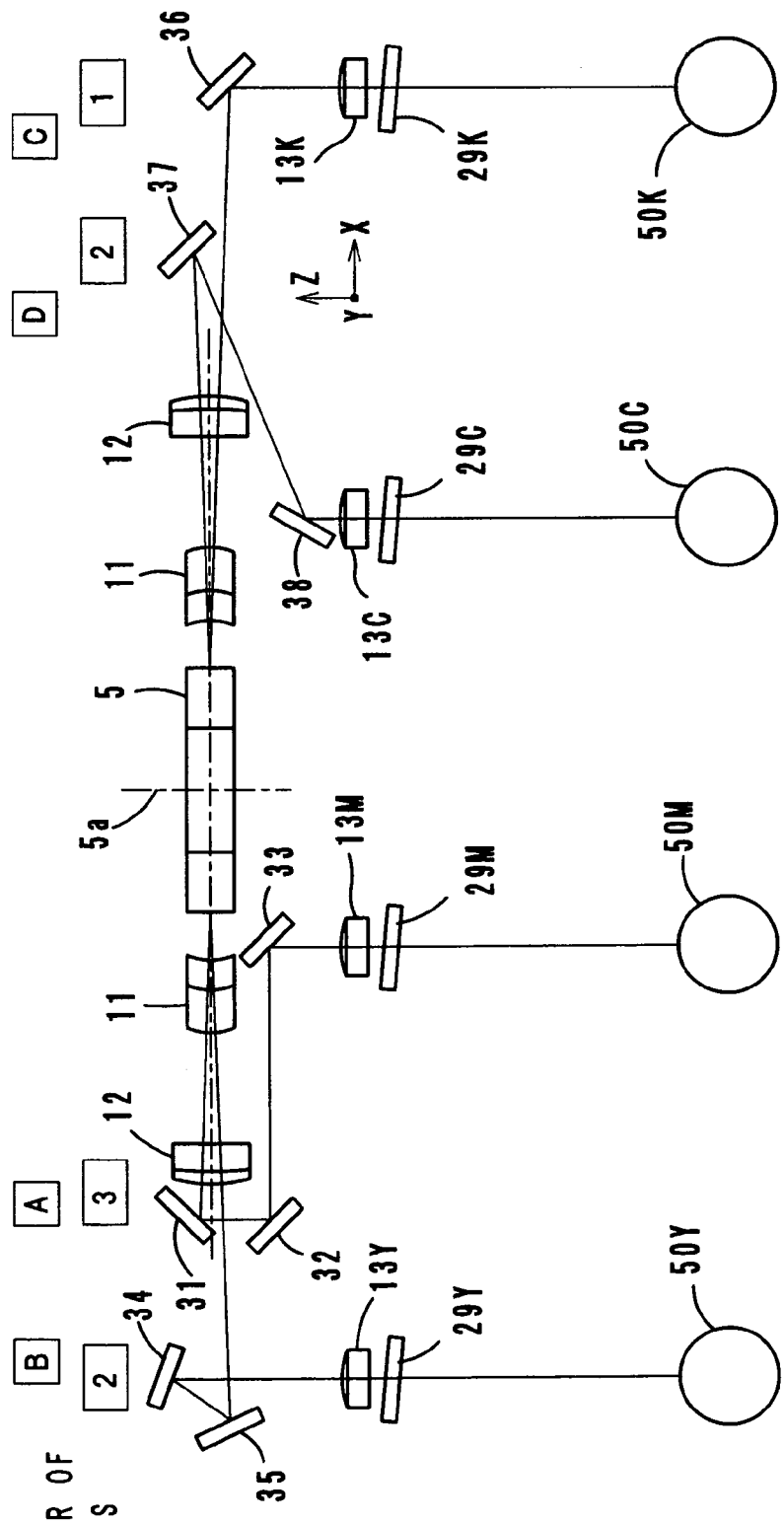

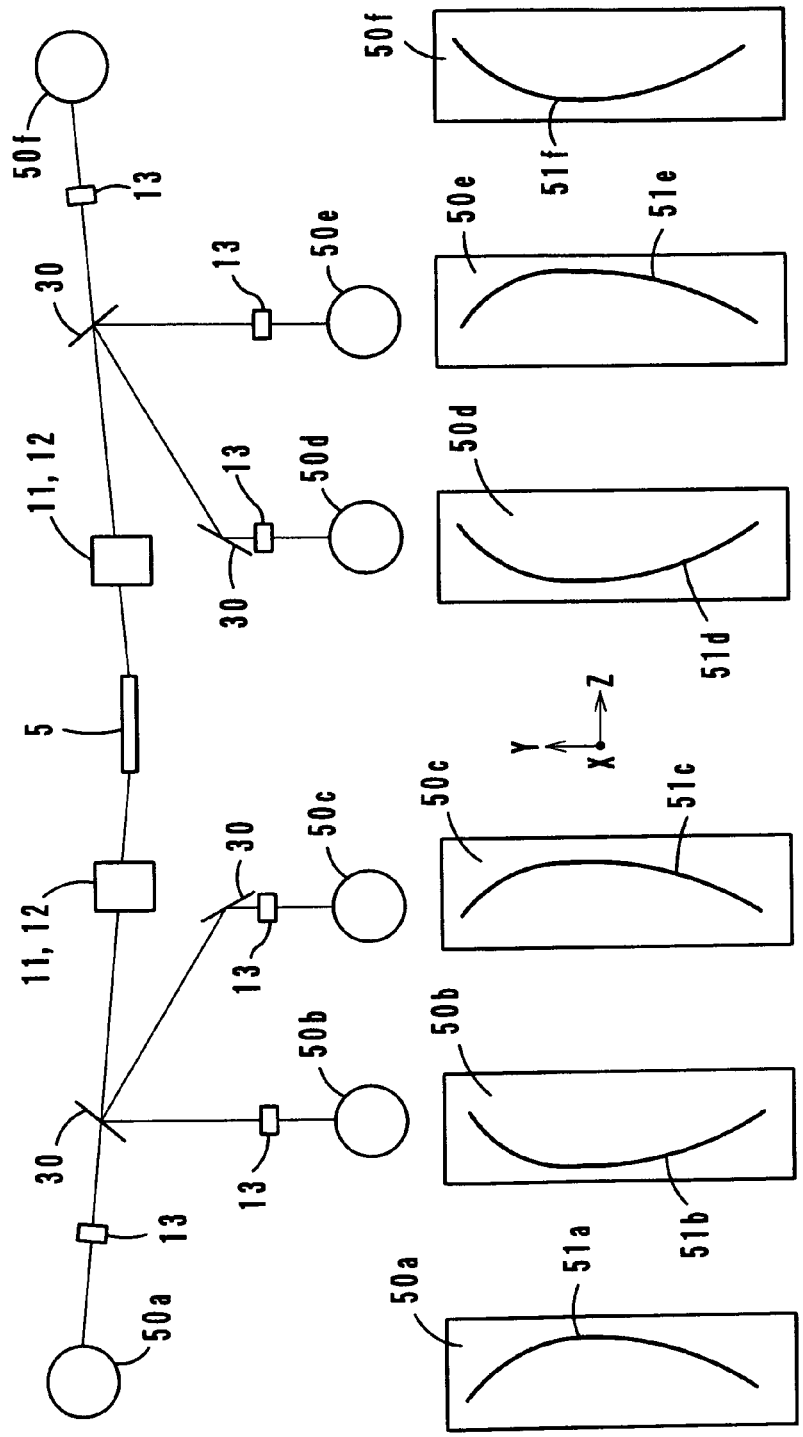

OPTICAL SCANNING APPARATUS

This application is based on Japanese application No. 2005-148192 filed on May 20, 2005 and Japanese application No. 2005-148195 filed on May 20, 2005, the contents of which are incorporated by reference.

BACKGROUND OF THE INVENTION

1. Field of the Invention

The present invention relates to an optical scanning apparatus, and more particularly to an optical scanning apparatus for scanning a plurality of beams modulated in accordance with image data on receiving surfaces by use of a single deflector.

2. Description of Related Art

In recent years, in the field of image forming apparatuses, such as full-color copying machines, printers, etc., a tandem type is general. In the tandem type, four photosensitive members respectively for Y (yellow), M (magenta), C (cyan) and K (black) are arranged in parallel, and images in the respective colors formed on the photosensitive members are transferred onto an intermediate transfer belt so that the color images can be combined with each other. In an image forming apparatus of the tandem type, for example, an optical scanning apparatus which comprises a single deflector (polygon mirror) for scanning four beams concurrently to write images on the four photosensitive members is provided.

In an optical scanning apparatus of this type, on each side of a deflector, an upper scanning system and a lower scanning system are provided. Three types of the upper and lower scanning systems are known. One is a type composed of lenses commonly used for the upper scanning system and the lower scanning system. Another is a type composed of lenses exclusively used for the upper system and lenses exclusively used for the lower system. The other is a type composed of one or more lenses commonly used for the upper and lower scanning systems, lenses exclusively used for the upper system and lenses exclusively used for the lower system. Of these three types, the type composed of lenses commonly used for the upper and lower systems is the most advantageous in view of cost.

However, when a single set of lenses is to be used commonly for the upper and lower systems, the optical surfaces of the lenses must be shaped symmetrically in a sub-scanning direction. Accordingly, when beams are incident to the optical surfaces of the lenses at an angle with respect to the sub-scanning direction, on receiving surfaces, writing lines in the sub-scanning direction have remarkable bows. Then, if the lenses are designed to correct the bows, other aberrations will become heavier, and the beam performance will be worse. If the bows are kept unsolved, because the bow occurring in the upper system and the bow occurring in the lower system are different in curving direction, an image having color displacement in the sub-scanning direction will be formed.

Japanese Patent Laid-Open Publication No. 2002-202472 discloses an optical scanning apparatus wherein the numbers of diverting mirrors provided respectively on the right side, on the left side, on the upper side and on the lower side of a deflector are regulated so that bows caused by linear expansions of a housing with changes in temperature will be uniform in curving direction. According to this publication, the number of diverting mirrors provided on the right side of the deflector and the number of diverting mirrors provided on the left side of the deflector are respectively even and odd or respectively odd and even. The number of diverting mirrors provided on the upper side of the deflector and the number of diverting mirrors provided on the lower side of the deflector are both even or both odd. However, in the optical scanning apparatus according to this publication, lenses are exclusively used for each optical system, and therefore, the apparatus is costly. Also, since beams are not incident to the deflector at an angle, the deflector must be made thick, which further increases the cost. While the number of diverting mirrors on the right side of the deflector and the number of diverting mirrors on the left side of the deflector are respectively even and odd or respectively odd and even, the number of diverting mirrors above the deflector and the number of diverting mirrors below the deflector are both even or both odd. Therefore, although bows caused by linear expansions of a housing are uniform in curving direction, bows in four colors caused by the design of optical elements are different in curving direction.

According to Japanese Patent Laid-Open Publication No. 2004-70107 discloses an optical scanning apparatus wherein the number of diverting mirrors provided on the right side of the deflector and the number of diverting mirrors provided on the left side of the deflector are both even or both odd and wherein the number of diverting mirrors provided above the deflector and the number of diverting mirrors provided below the deflector are respectively even and odd or respectively odd and even. Accordingly, in this optical scanning apparatus also, bows in four colors are different in curving direction.

SUMMARY OF THE INVENTION

An object of the present invention is to provide an optical scanning apparatus which has a good beam performance even with a less costly lens system and which prevents color displacement by making bows on receiving surfaces have the same curving direction.

In order to attain the object, a first aspect of the present invention relates to an optical scanning apparatus comprising: a plurality of light sources; a deflector for deflecting beams emitted from the light sources in a main scanning direction; lenses for imaging the deflected beams on receiving surfaces respectively; and diverting mirrors for directing the beams which passed through the lenses to the receiving surfaces respectively. In the optical scanning apparatus, the deflector is common to the plurality of light sources, and said lenses are located in a right side and in a left side of the deflector before the diverting mirrors. Each of the lenses has a surface which is of a shape symmetrical in a sub-scanning direction. Further, if the diverting mirrors located in an upper optical path in the left side of the deflector are A in number, if the diverting mirrors located in a lower optical path in the left side of the deflector are B in number, if the diverting mirrors located in a lower optical path in the right side of the deflector are C in number and if the diverting mirrors located in an upper optical path in the right side of the deflector are D in number, the following conditions are satisfied:

$|A-B|=2 \times i+1$ $|C-D|=2 \times j+1$ $|A-D|=2 \times m+1$ $|B-C|=2 \times n+1$ wherein, i, j, m and n are integers not less than 0.

In the optical scanning apparatus according to the first aspect of the present invention, the right side and the left side of the deflector means the sides which are symmetrical with each other on a rotation axis of the deflector. The lower optical path means the optical path which permits the beam deflected by the deflector to travel closer to the receiving surfaces than an optical axis of said lens. The upper optical path means the optical path which permits the beam to travel in the opposite side of the receiving surfaces.

In the optical scanning apparatus according to the first aspect of the present invention, since the imaging lens which is provided in each side of the deflector before the diverting mirror for making an upper optical path and a lower optical path is of a shape symmetrical in the sub-scanning direction, it is possible to use the lens commonly for the upper optical path and the lower optical path. This results in a reduction in cost. Further, by locating the diverting mirrors to satisfy the conditions above, and more specifically by setting the number of diverting mirrors located in the upper left side to be an even number, by setting the number of diverting mirrors located in the lower left side to be an odd number, by setting the number of diverting mirrors located in the upper right side to be an odd number and by setting the number of diverting mirrors located in the lower right side to be an even number, or by setting the number of diverting mirrors located in the upper left side to be an odd number, by setting the number of diverting mirrors located in the lower left side to be an even number, by setting the number of diverting mirrors located in the upper right side to be an even number and by setting the number of diverting mirrors located in the lower right side to be an odd number, the curving directions of bows of writing lines seen on receiving surfaces become uniform. Thereby, color displacement in the sub-scanning direction can be prevented.

In the optical scanning apparatus according to the first aspect of the present invention, preferably, at least one of the diverting mirrors is provided with a device for correcting bows on the corresponding receiving surface. The correcting device corrects the bows by bending the mirror in the main scanning direction appropriately. With this device, even when the design cannot solve large bows, correction of the bows becomes possible. In this case, the above conditions on the number of diverting mirrors are to make the curving directions of slight bows still remaining after the correction uniform.

A second aspect of the present invention relates to an optical scanning apparatus comprising: four light sources; a deflector which rotates to deflect beams emitted from the four light sources in a main scanning direction; a first optical system for imaging a first beam and a second beam of the beams deflected by the deflector on receiving surfaces; a second optical system for imaging a third beam and a fourth beam of the beams deflected by the deflector on receiving surfaces; and a plurality of diverting mirrors for directing the beams which passed through the first optical system and the second optical system to the receiving surfaces. In the optical scanning apparatus according to the second aspect of the present invention, the first optical system has at least one lens through which both the first beam and the second beam pass and which is of a shape symmetrical in a sub-scanning direction, and the second optical system has at least one lens through which both the third beam and the fourth beam pass and which is of a shape symmetrical in the sub-scanning direction. The first beam is incident to the deflector symmetrically with the fourth beam on a rotation axis of the deflector, and the second beam is incident to the deflector symmetrically with the third beam on the rotation axis of the deflector. Further, if the diverting mirrors located in an optical path of the first beam are A in number, if the diverting mirrors located in an optical path of the second beam are B in number, if the diverting mirrors located in an optical path of the third beam are C in number and if the diverting mirrors located in an optical path of the fourth beam are D in number, the following conditions are satisfied:

$$|A-B|=2 \times i+1$$

$$|C-D|=2 \times j+1$$

$$|A-D|=2 \times m+1$$

$$|B-C|=2 \times n+1$$

wherein, i, j, m and n are integers not less than 0.

In the optical scanning apparatus according to the second aspect of the present invention, each of the first optical system and the second optical system has at least one lens which two beams pass through and which is of a shape symmetrical in the sub-scanning direction. Thus, one lens is commonly used for the optical path of the first beam and for the optical path of the second beam, and one lens is commonly used for the optical path of the third beam and for the optical path of the fourth beam. This results in a reduction in cost. Further, as described in connection with the first aspect of the present invention, by setting the number of diverting mirrors to satisfy the above conditions, the curving direction of bows of writing lines seen on the receiving surfaces become uniform. Thereby, color displacement in the sub-scanning direction can be prevented.

In the optical scanning apparatus according to the second aspect of the present invention, the first beam and the second beam pass through said lens in the first optical system preferably at positions equally far away from the optical axis of the lens, and the third beam and the fourth beam pass through said lens in the second optical system preferably at the positions equally far away from the optical axis of the lens. Each of said lens in the first optical system and said lens in the second optical system may be line symmetrical on an axis perpendicular to the rotation axis of the deflector. Also, the first optical system and the second optical system may be located to be line symmetrical with each other on the axis perpendicular to the rotation axis of the deflector.

Both in the optical scanning apparatus according to the first aspect of the present invention and in the optical scanning apparatus according to the second aspect of the present invention, it is preferred that the beams emitted from the respective light sources are incident to the deflector at a specified angle in a plane of sub-scanning. Thereby, it is possible to divide the beams into the upper optical system and the lower optical system without increasing the thickness of the deflector.

BRIEF DESCRIPTION OF THE DRAWINGS

This and other objects and features of the present invention will be apparent from the following description, with reference to the accompanying drawings, in which:

FIGS. 2a and 2b show an optical path between a light source and a deflector of the optical scanning apparatus shown by FIG. 1, FIG. 2a being an X-Y side view and FIG. 2b being an X-Z side view;

FIG. 3 is an X-Z side view of the optical scanning apparatus according to the first embodiment, showing an optical path between the deflector and receiving surfaces;

FIG. 4 is an X-Z side view of an optical scanning apparatus according to a second embodiment of the present invention, showing an optical path between a deflector and receiving surfaces;

FIGS. 6a and 6b show a bow correction device, FIG. 6a being an X-Z side view and FIG. 6b being an X-Y side view;

FIG. 8 is an X-Z side view of the optical scanning apparatus according to the third embodiment, showing an optical path between a deflector and receiving surfaces; and FIG. 9 is a conceptual view showing the curving directions of bows on receiving surfaces.

DETAILED DESCRIPTION OF THE PREFERRED EMBODIMENTS

Preferred embodiments of optical scanning apparatuses according to the present invention are hereinafter described with reference to the accompanying drawings.

First and Second Embodiments; See FIGS. 1–4

Figure 1:
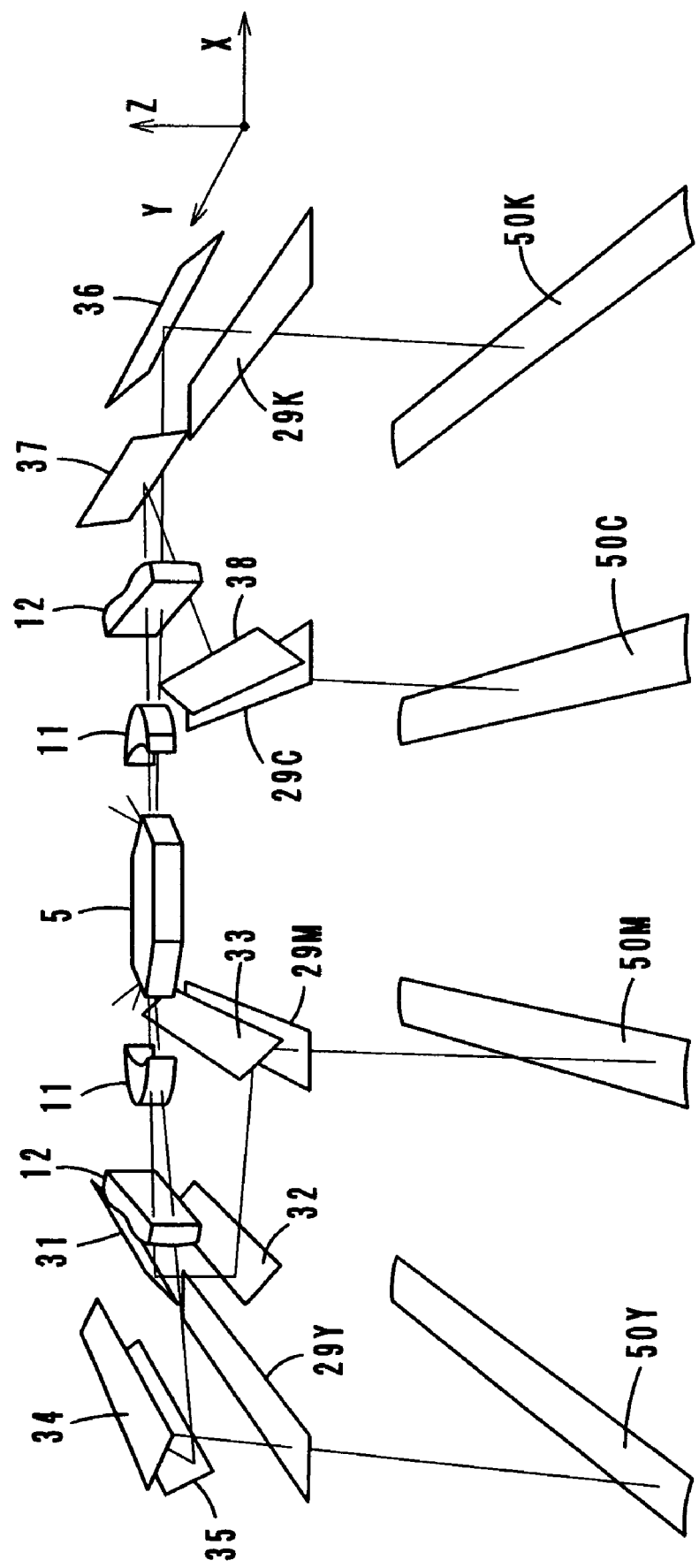
FIG. 1 is a three-dimensional conceptual view of an optical scanning apparatus according to a first embodiment of the present invention.

FIGS. 1–3 show an optical scanning apparatus according to a first embodiment of the present invention. FIG. 1 shows arrangement of elements three-dimensionally and conceptually, and FIG. 2 shows an optical path between a light source and a deflector. FIG. 3 is a sectional view in a sub-scanning direction. FIG. 4 is a sectional view taken in a sub-scanning direction of an optical scanning apparatus according to a second embodiment of the present invention.

The optical scanning apparatus according to the first embodiment is structured as an exposure scanning unit of an electrophotographic image forming apparatus of a tandem type, and as FIG. 3 shows, the optical scanning apparatus forms images for yellow, magenta, cyan and black respectively on four photosensitive drums 50 (50Y, 50M, 50C and 50K). The images (electrostatic latent images) formed on the photosensitive drums 50 are developed into toner images. Thereafter, the toner images are transferred onto an intermediate transfer belt and combined thereon with each other (first transfer). Then, the composite image is transferred onto a recording member (second transfer). This image forming process is well known, and a description thereof is omitted.

As FIGS. 2a and 2b show, the optical scanning apparatus has four light source units, each of which comprises a laser diode 1, a collimator lens 2 and a cylindrical lens 3, arranged respectively in the right upper side, in the right lower side, in the left upper side and in the left lower side. Further, two half mirrors 4 are provided so that one will be located in optical paths of the two right-side light source units and that the other will be located in optical paths of the two left-side light source units. The beams emitted from the four laser source units are incident to a single polygon mirror 5. More specifically, in each of the light source units, a beam (diffusing light) radiated from the laser diode 1 is collimated into a parallel light by the collimator lens 2, and the collimated light is converted by the cylindrical lens 3 so that the light will become linear in a sub-scanning direction Z on deflecting surfaces of the polygon mirror 5. Each of the half mirrors 4 combines two beams emitted from adjacent two light source units with each other in a main scanning direction Y, and the beams are directed to the polygon mirror 5.

As FIG. 2b shows, in view of the sub-scanning direction Z, each of the light source units is located at an angle of θ/2 to the axis of the polygon mirror 5 in a main scanning direction Y'. In other words, each beam is incident to the deflecting surfaces of the polygon mirror 5 at an angle of θ/2 in a plane of the sub-scanning direction Z.

It is not always necessary to arrange the light source units so that the beams from the four light source units are incident to the polygon mirror 5 at an angle. By doing so, however, it becomes possible to direct the beams from the polygon mirror 5 separately to an upper optical path and to a lower optical path without thickening the polygon mirror 5.

As FIGS. 1 and 3 show, the optical scanning apparatus further comprises two sets of a first lens 11 and a second lens 12 for imaging the beams deflected by the polygon mirror 5 in the main scanning direction Y on the respective photosensitive drums 50, a plurality of diverting mirrors 31 through 38 for reflecting the beams to direct the beams to the respective photosensitive drums 50, and dust protective window glasses 29Y, 29M, 29C and 29K.

The two sets of lenses 11 and 12 are located before the diverting mirrors 31 through 38 respectively in the right side and in the left side of the polygon mirror 5 with the rotation axis 5a (see FIG. 3) of the polygon mirror 5 as the center. The optical surfaces of the lenses 11 and 12 are symmetrical in the sub-scanning direction Z, that is, symmetrical in the vertical direction in FIG. 3. Data of the surfaces of the lenses 11 and 12 will be shown later (see Table 2 through 4).

Regarding the number of diverting mirrors 31 through 38, if the number of mirrors located in the upper optical path at one side (in the optical path for magenta) is A, if the number of mirrors located in the lower optical path at the same side (in the optical path for yellow) is B, if the number of mirrors located in the upper optical path at the other side (in the optical path for black) is C and if the number of mirrors located in the upper optical path at the same side (in the optical path for cyan) is D, according to the first embodiment, the numbers A, B, C and D are three, two, one and two, respectively.

Referring to FIG. 3, in the left side of the polygon mirror 5, the number A of diverting mirrors located in the upper optical path and the number B of diverting mirrors located in the lower optical path are three and two respectively, that is, an odd number and an even number. In the right side of the polygon mirror 5, the number C of diverting mirrors located in the upper optical path and the number D of diverting mirrors located in the lower optical path are one and two respectively, that is, an odd number and an even number. Also, in the optical paths passing through the upper portions of the first lenses 11 and the second lenses 12, the number A of diverting mirrors and the number D of diverting mirrors are three and two respectively, that is, an odd number and an even number. In the optical paths passing through the lower portions of the first lenses 11 and the second lenses 12, the number B of diverting mirrors and the number C of diverting mirrors are two and one respectively, that is, an even number and an odd number.

According to the second embodiment, regarding the number of diverting mirrors 41 through 46, as FIG. 4 shows, the number A of mirrors located in the upper optical path at one side (in the optical path for yellow) is one, and the number B of mirrors located in the lower optical path at the same side (in the optical path for magenta) is two. The number C of mirrors located in the upper optical path at the other side (in the optical path for black) is one, and the number D of mirrors located in the upper optical path at the same side (in the optical path for cyan) is two.

Thus, in the left side of the polygon mirror 5, the number A of diverting mirrors located in the upper optical path and the number B of diverting mirrors located in the lower optical path are one and two respectively, that is, an odd number and an even number. In the right side of the polygon mirror 5, the number C of diverting mirrors located in the upper optical path and the number D of diverting mirrors located in the lower optical path are one and two respectively, that is, an odd number and an even number. Also, in the optical paths passing through the upper portions of the first lenses 11 and the second lenses 12, the number A of diverting mirrors and the number D of diverting mirrors are one and two respectively, that is, an odd number and an even number. In the optical paths passing through the lower portions of the first lenses 11 and the second lenses 12, the number B of diverting mirrors and the number C of diverting mirrors are two and one respectively, that is, an even number and an odd number.

The other parts of the second embodiment shown by FIG. 4 are the same as those of the first embodiment shown by FIGS. 1 through 3. The same parts are denoted by the same reference numbers as shown in FIGS. 1 through 3, and repetitious descriptions thereof are omitted.

According to the first and second embodiments, the upper optical paths in the right and the left sides and the lower optical paths in the right and the left sides pierce through the respective sets of lenses 11 and 12 at the positions at the same distance from the respective optical axes of the lenses 11 and 12. Thereby, the lenses 11 and 12 in the right-side optical systems and the lenses 11 and 12 in the left-side optical systems are symmetrical on an axis perpendicular to the rotation axis 5*a* of the polygon mirror 5. Accordingly, the lenses 11 have same errors in the same parts, and the lenses 12 have same errors in the same parts, and displacement (color displacement in an image) is not remarkable.

Curving Directions of Bows; See FIG. 5

Figure 5:
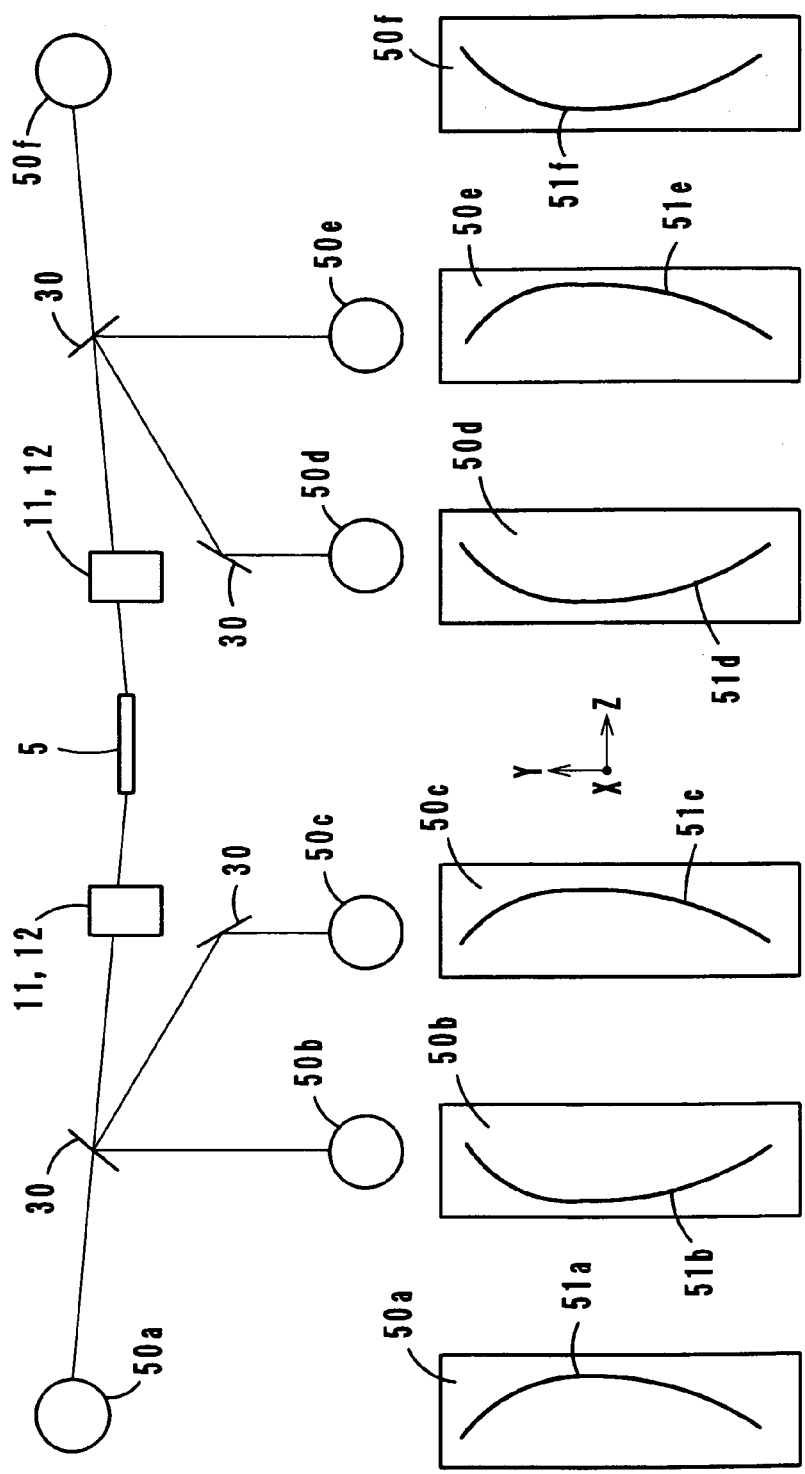
FIG. 5 is a conceptual view showing the curving directions of bows on the receiving surfaces.

FIG. 5 is a conceptual view of curvatures in the sub-scanning direction (bows) of lines written on receiving surfaces. FIG. 5 shows the relationship between the number of diverting mirrors 30 and the curving directions of bows 51*a* through 51*f* on receiving surfaces 50*a* through 50*f*. Here, the illustrated bows 51*a* through 51*f* are caused by the upper optical paths piercing through the upper parts of the first and second lenses 11 and 12. Although bows caused by the lower optical paths are not shown in FIG. 5, the bows caused by the lower optical path have curving directions inverted from those of the bows caused by the upper optical paths because the upper optical paths and the lower optical paths are symmetrical with each other in the vertical direction.

As is apparent from FIG. 5, when the number of diverting mirrors 30 located in the right side of the polygon mirror 5 and the number of diverting mirrors 30 located in the left side of the polygon mirror 5 are respectively an even number and an odd number or respectively an odd number and an even number, the bow caused by the right-side optical path and the bow caused by the left-side optical path have the same curving direction. As shown in FIG. 5, for example, the bows on the receiving surfaces 50*a*, 50*c* and 50*e* have the same curving direction, and the bows on the receiving surfaces 50*b*, 50*d* and 50*f* have the same curving direction. Thus, by specifying the number of diverting mirrors as to meet the conditions defined by the expressions in claim 1, bows on the receiving surfaces have the same direction, and color displacement can be effectively prevented.

Correction of Bows; See FIG. 6

A bow on the receiving surface 50 can be corrected by a correction device 25 shown in FIG. 6. The correction device 25 pushes and pulls a screw 26, which is standing on a diverting mirror 30, into and out of a fixed frame 27 so as to deform the center part (with respect to the main scanning direction) of the mirror 30 in the direction A. Thereby, a bend of the mirror 30 in the main scanning direction Y is adjusted. The mirror 30 is supported by fixers 39 at both ends, and a flat spring 28 is disposed opposite the screw 26.

Thus, by adjusting the bend of the diverting mirror 30 with the screw 26, the bow on the receiving surface 50 can be corrected. Even if the design of the whole scanning apparatus causes a great degree of bow, it is possible to correct the bow with the device 25. When the bow is corrected in this way, the conditions of the number of diverting mirrors shown by the above expressions are to adjust the displacement in the sub scanning direction Z still remaining after the correction of bow.

The correction device 25 may be provided for any of the diverting mirrors. Preferably, however, the correction device 25 is provided for one of the mirrors in the optical path for each of the four colors. In the optical path for each color, it is fair to select the diverting mirror to be provided with the correction device 25 depending on the easiness in view of the design of the optical path. It is, however, preferred that a mirror with high correction sensitivity is selected. More specifically, when the correction device 25 is provided for a mirror to which a beam is incident at an obtuse angle, a bend of the mirror caused by the correction device 25 causes a larger change of bow.

Arrangement and Construction Data of Optical Elements

Table 1 below shows the arrangement of optical elements according to the first and second embodiments. Tables 2, 3 and 4 show data on the free curved surfaces of the lenses 11 and 12. These free curved surfaces are calculated by the free curved surface expression (1) below.

As is apparent from Tables 2, 3 and 4, only coefficients with degrees of even numbers are used for the sub scanning direction Z, and the surfaces of the first and second lenses 11 and 12 are symmetrical in the sub scanning direction Z. Accordingly, same lenses can be used for the upper optical paths and the lower optical paths, which results in a reduction of cost.

$$X = \sum_i \sum_j C_{ij} \cdot Y^i \cdot Z^j \qquad (1)$$

TABLE 1

Arrangement of Optical Elements

| | Surface No. | Radius of Curvature | Coordinates of Surface Vertex X | Y | Z | Refractive Index |
|---|---|---|---|---|---|---|
| 1st Lens | 1 | Free | 33.6 | 0.0 | 0.0 | 1.525 |
| | 2 | Free | 40.6 | 0.0 | 0.0 | Air |
| 2nd Lens | 3 | INF | 58.6 | 0.0 | | 1.525 |
| | 4 | Free | 64.6 | 0.0 | 0.0 | Air |
| Window | 5 | INF | 130.3 | 0.0 | 0.0 | 1.511 |
| Glass | 6 | INF | 132.3 | 0.0 | | Air |
| Photosensitive Drum | | INF | 190.3 | 0.0 | 0.0 | |

TABLE 2

Data of Free Curved Surface (First Lens, First Surface)

| Free Curved Surface | | Z | | |
|---|---|---|---|---|
| Coefficient Cij | | 0 | 2 | 4 |
| Y | 0 | 0.0000E+00 | −4.0737E−02 | −1.0588E−04 |
| | 1 | −2.6247E−03 | 5.3076E−05 | 1.3842E−06 |
| | 2 | −1.2051E−02 | 1.8255E−05 | 2.0930E−07 |
| | 3 | −1.1776E−05 | −7.9364E−07 | −1.1603E−08 |
| | 4 | −9.6303E−06 | −3.1653E−07 | 1.1697E−09 |
| | 5 | 1.2970E−07 | 5.5610E−09 | 1.3499E−11 |
| | 6 | 4.9308E−08 | 1.8077E−09 | −5.6970E−12 |
| | 7 | −3.2341E−10 | −1.6569E−11 | 0.0000E+00 |
| | 8 | −8.4784E−11 | −4.2272E−12 | 0.0000E+00 |
| | 9 | 2.7735E−13 | 1.7653E−14 | 0.0000E+00 |
| | 10 | 4.8371E−14 | 3.7680E−15 | 0.0000E+00 |

TABLE 3

Data of Free Curved Surface (First Lens, Second Surface)

| Free Curved Surface | | Z | | |
|---|---|---|---|---|
| Coefficient Cij | | 0 | 2 | 4 |
| Y | 0 | 0.0000E+00 | −4.2876E−02 | −6.5290E−05 |
| | 1 | −1.8733E−02 | −2.3454E−05 | −2.4907E−07 |
| | 2 | −1.8900E−02 | −3.1899E−05 | −1.9783E−07 |
| | 3 | −1.6931E−06 | −4.4449E−08 | −1.1897E−09 |
| | 4 | −5.7447E−06 | −8.8915E−08 | −3.6817E−10 |
| | 5 | 3.6375E−08 | 4.7827E−10 | 7.4846E−12 |
| | 6 | 1.6561E−08 | 2.3450E−10 | 1.4519E−12 |
| | 7 | −5.0233E−11 | −2.7074E−13 | 0.0000E+00 |
| | 8 | −3.9249E−12 | 8.4443E−14 | 0.0000E+00 |
| | 9 | 3.5472E−15 | −7.1293E−16 | 0.0000E+00 |
| | 10 | −1.5205E−14 | −4.1943E−16 | 0.0000E+00 |

TABLE 4

Data of Free Curved Surface (Second Lens, Fourth Surface)

| Free Curved Surface | | Z | | |
|---|---|---|---|---|
| Coefficient Cij | | 0 | 2 | 4 |
| Y | 0 | 0.0000E+00 | −2.0267E−02 | −3.5508E−06 |
| | 1 | 5.2996E−03 | −5.0499E−06 | 3.3093E−08 |
| | 2 | 1.4905E−03 | 4.6204E−06 | 9.4211E−09 |
| | 3 | −9.5829E−06 | −2.9058E−08 | −6.6226E−11 |
| | 4 | −3.0656E−06 | −4.8388E−09 | −6.7502E−12 |
| | 5 | 7.2320E−09 | 3.3938E−11 | 1.6436E−14 |
| | 6 | 1.3760E−09 | 3.2249E−12 | 1.0230E−15 |
| | 7 | −2.6680E−12 | −1.8213E−14 | 0.0000E+00 |
| | 8 | −3.9483E−13 | −1.2214E−15 | 0.0000E+00 |
| | 9 | 3.7804E−16 | 3.6765E−18 | 0.0000E+00 |
| | 10 | 4.9898E−17 | 1.9182E−19 | 0.0000E+00 |

Figure 7:
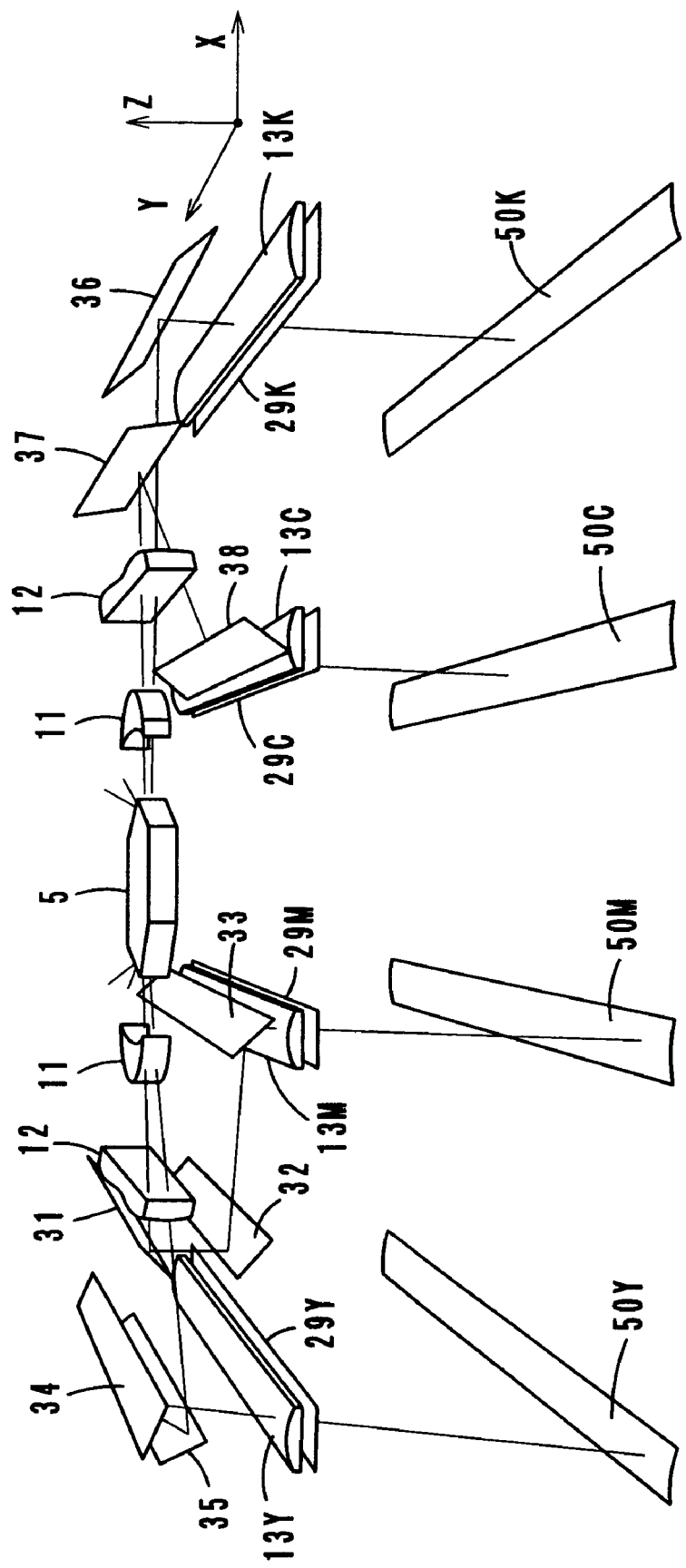
FIG. 7 is a three-dimensional conceptual view of an optical scanning apparatus according to a third embodiment.

Third Embodiment: FIGS. 7 through 9

FIG. 7 is a three-dimensional conceptual view of an optical scanning apparatus according to a third embodiment, and FIG. 8 is a sectional view of the optical scanning apparatus taken in the sub scanning direction.

This optical scanning apparatus is basically of the same structure as that of the first embodiment. In FIG. 7, the same parts are provided with the same reference numbers as those in FIG. 1, and a repetitious description of these parts is omitted. In the third embodiment, third lenses 13 (13Y, 13M, 13C and 13K), which compose a second imaging system for imaging the separated beams onto the respective photosensitive drums 50, are added to the structure according to the first embodiment.

The third lenses 13Y, 13M, 13C and 13K are made by use of the same mold and are located to extend in the main scanning direction Y. The first surface (beam incident surface) of each of the third lenses 13 is asymmetrical both in the main scanning direction Y and in the sub-scanning direction Z, and therefore, it is possible to further correct a bow which cannot be corrected sufficiently even by the first lenses 11 and 12 and the adjustment of the bend of a diverting mirror. The data on the first surfaces of the third lenses 13 will be shown later (see Table 10).

FIG. 9 is a conceptual view showing the curving directions of bows on receiving surfaces, and the description of FIG. 5 shall be referred to. According to the third embodiment, in each of the optical paths, there are no diverting mirrors provided between the third lens 13 and the receiving surface 50. However, if one or more diverting mirrors are provided between the third lens 13 and the receiving surface 50 in each of the optical paths, the mirrors provided between the respective third lenses 13 and the respective receiving surfaces 50 shall be equal in number so as not to change the curving directions of bows.

Arrangement and Construction Data of Optical Elements

Table 5 below shows arrangement of the optical elements according to the third embodiment. Table 6 shows eccentricity data on a seventh surface and an eighth surface. Table 7 shows the free curved surface data on the first surface (the first surface of the first lens 11), and Table 8 shows the free curved surface data on the second surface (the second surface of the first lens 11). Table 9 shows the free curved surface data on the fourth surface (the second surface of the second lens 12), and Table 10 shows the free curved surface data on the fifth surface (the first surface of the third lens 13). These free curved surfaces are calculated by use of the expression (1).

As is apparent from Tables 7 through 9, only coefficients of degrees of even numbers are used for the sub-scanning direction Z, and the first lenses 11 and the second lenses 12 are symmetrical in the sub-scanning direction Z. Thereby, the same lenses can be used for the upper optical paths and the lower optical paths, which results in a reduction in cost. Also, the third lenses 13 with the same free curved surface data are used in the respective optical paths.

TABLE 5

Basic Data

| Surface | | Radius of Curvature | Coordinate of Surface Vertex | | | Thickness | Refractive Index (780 |
|---|---|---|---|---|---|---|---|
| | No. | | X | Y | Z | | of Core nm) |
| 1st Lens | 1 | Free | 28 | 0 | 0 | 8 | 1.5244 |
| | 2 | Free | 36 | 0 | 0 | 27 | Air |
| 2nd Lens | 3 | INF | 63 | 0 | 0 | 7 | 1.5244 |
| | 4 | Free | 70 | 0 | 0 | 87.31 | Air |
| 3rd Lens | 5 | Free | 157.31 | 0 | 3.6 | 4 | 1.5244 |
| | 6 | INF | 161.31 | 0 | 3.6 | 56 | Air |
| Window | 7 | INF | 217.31 | 0 | 0 | 1.99 | 1.5112 |
| Glass | 8 | INF | 219.3 | 0 | −0.1743 | 38.01 | Air |
| Photosensitive Drum | | INF | 257.31 | 0 | 0 | — | — |

TABLE 6

Eccentricity Data

| Surface No. | Axis | Vector | | |
|---|---|---|---|---|
| | | X Component | Y Component | Z Component |
| 7 | X | 0.9962 | 0 | −0.0872 |
| | Y | 0 | 1 | 0 |
| 8 | X | 0.9962 | 0 | −0.0872 |
| | Y | 0 | 1 | 0 |

TABLE 7

Free Curved Surface Data (First Surface)

| Free Curved Surface Coefficient Cij | | Z 0 |
|---|---|---|
| Y | 1 | 2.2405E−02 |
| | 2 | −9.4985E−03 |
| | 3 | 9.4625E−06 |
| | 4 | −4.5473E−06 |
| | 5 | −1.4308E−08 |
| | 6 | 1.2060E−08 |
| | 7 | −1.3735E−11 |
| | 8 | −9.3864E−12 |
| | 9 | 1.7872E−14 |
| | 10 | 2.1055E−15 |

TABLE 8

Free Curved Surface Data (Second Surface)

| Free Curved Surface Coefficient Cij | | Z 0 |
|---|---|---|
| Y | 1 | 6.0065E−03 |
| | 2 | −1.4108E−02 |
| | 3 | 8.1494E−06 |
| | 4 | −2.8887E−06 |
| | 5 | −1.0645E−08 |

TABLE 8-continued

Free Curved Surface Data (Second Surface)

| Free Curved Surface Coefficient Cij | | Z 0 |
|---|---|---|
| | 6 | 4.3185E−09 |
| | 7 | −1.4931E−11 |
| | 8 | 7.6883E−13 |
| | 9 | 1.2065E−14 |
| | 10 | −1.9467E−15 |

TABLE 9

Free Curved Surface Data (Fourth Surface)

| Free Curved Surface Coefficient Cij | | Z | | |
|---|---|---|---|---|
| | | 0 | 2 | 4 |
| Y | 0 | 0.0000E+00 | −2.2638E−03 | 1.1469E−07 |
| | 1 | −9.2676E−04 | 3.8763E−06 | −2.7823E−09 |
| | 2 | 9.8379E−04 | 7.0194E−08 | −6.1723E−09 |
| | 3 | −7.6517E−07 | −2.5908E−09 | 3.6114E−12 |
| | 4 | −1.1004E−06 | 1.6014E−10 | 5.0038E−12 |
| | 5 | 7.1366E−10 | 5.8672E−13 | −1.2029E−15 |
| | 6 | 2.4874E−10 | −2.9721E−13 | −1.0156E−15 |
| | 7 | −1.5832E−13 | 8.2403E−20 | 0.0000E+00 |
| | 8 | −3.6004E−14 | 1.0343E−16 | 0.0000E+00 |
| | 9 | 1.1887E−17 | −8.2907E−21 | 0.0000E+00 |
| | 10 | 2.3198E−18 | −1.0789E−20 | 0.0000E+00 |

TABLE 10

Free Curved Surface Data (Fifth Surface)

| Free Curved Surface Coefficient Cij | | Z | |
|---|---|---|---|
| | | 0 | 1 |
| Y | 0 | 3.0413E−02 | 1.5461E−02 |
| | 1 | 3.9248E−06 | −5.8314E−07 |
| | 2 | −1.1122E−06 | −5.3346E−07 |
| | 3 | −1.4592E−10 | 2.1464E−10 |
| | 4 | 4.2403E−11 | 3.6271E−11 |
| | 5 | −1.9013E−14 | −2.0044E−14 |
| | 6 | −3.6439E−15 | −2.5055E−15 |
| | 7 | 1.3809E−18 | 8.2438E−19 |
| | 8 | 1.4756E−19 | 8.1300E−20 |

OTHER EMBODIMENTS

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical scanning apparatus comprising:
a plurality of light sources;
a deflector for deflecting beams emitted from the light sources in a main scanning direction;
lenses for imaging the deflected beams on receiving surfaces respectively; and
diverting mirrors for directing the beams which passed through the lenses to the receiving surfaces respectively,
wherein:

the deflector is common to the plurality of light sources;

the lenses are located in a right side and in a left side of the deflector before the diverting mirrors, and each of the lenses has a surface which is of a shape symmetrical in a sub-scanning direction; and if the diverting mirrors located in an upper optical path in said left side of the deflector are A in number, if the diverting mirrors located in a lower optical path in said left side of the deflector are B in number, if the diverting mirrors located in a lower optical path in said right side of the deflector are C in number and if the diverting mirrors located in an upper optical path in said right side of the deflector are D in number, the following conditions are satisfied:

$|A-B|=2 \times i+1$ $|C-D|=2 \times j+1$ $|A-D|=2 \times m+1$ $|B-C|=2 \times n+1$ wherein, i, j, m and n are integers not less than 0.

2. An optical scanning apparatus according to claim 1, further comprising a bow correction device provided for at least one of the diverting mirrors, wherein the bow correction device bends the diverting mirror in the main scanning direction so as to correct a bow in the sub-scanning direction seen on the corresponding receiving surface.

3. An optical scanning apparatus according to claim 2, wherein the bow correction device is provided for a diverting mirror to which a beam is incident at an obtuse angle.

4. An optical scanning apparatus according to claim 1, wherein the beams emitted from the respective light sources are incident to the deflector at a specified angle in a plane of sub-scanning.

5. An optical scanning apparatus comprising:

four light sources;

a deflector which rotates to deflect beams emitted from the four light sources in a main scanning direction;

a first optical system for imaging a first beam and a second beam of the beams deflected by the deflector on receiving surfaces;

a second optical system for imaging a third beam and a fourth beam of the beams deflected by the deflector on receiving surfaces; and a plurality of diverting mirrors for directing the beams which passed through the first optical system and the second optical system to the receiving surfaces, wherein:

the first optical system has at least one lens which both the first beam and the second beam pass through and which is of a shape symmetrical in a sub-scanning direction;

the second optical system has at least one lens which both the third beam and the fourth beam pass through and which is of a shape symmetrical in the sub-scanning direction;

the first beam is incident to the deflector symmetrically with the fourth beam on a rotation axis of the deflector, and the second beam is incident to the deflector symmetrically with the third beam on the rotation axis of the deflector; and if the diverting mirrors located in an optical path of the first beam are A in number, if the diverting mirrors located in an optical path of the second beam are B in number, if the diverting mirrors located in an optical path of the third beam are C in number and if the diverting mirrors located in an optical path of the fourth beam are D in number, the following conditions are satisfied:

$|A-B|=2 \times i+1$ $|C-D|=2 \times j+1$ $|A-D|=2 \times m+1$ $|B-C|=2 \times n+1$ wherein, i, j, m and n are integers not less than 0.

6. An optical scanning apparatus according to claim 5, wherein:

the first beam and the second beam pass through said lens in the first optical system at positions at a same distance from an optical axis of the lens; and the third beam and the fourth beam pass through said lens in the second optical system at positions at a same distance from an optical axis of the lens.

7. An optical scanning apparatus according to claim 5, wherein said lens in the first optical system and said lens in the second optical system are of a shape which is line symmetrical on an axis perpendicular to the rotation axis of the deflector.

8. An optical scanning apparatus according to claim 5, wherein the first optical system and the second optical system are arranged to be line symmetrical with each other on an axis perpendicular to the rotation axis of the deflector.

9. An optical scanning apparatus according to claim 5, wherein the beams emitted from the respective light sources are incident to the deflector at a specified angle in a plane of sub-scanning.

* * * * *